United States Patent
Miyazoe et al.

(10) Patent No.: US 8,613,292 B2
(45) Date of Patent: Dec. 24, 2013

(54) DECOMPRESSION SWITCHING VALVE (75) Inventors: Shinji Miyazoe, Tsukubamirai (JP);
Katsuyuki Senba, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 362 days.

(21) Appl. No.: 13/016,200

(22) Filed: Jan. 28, 2011

(65) Prior Publication Data
US 2011/0193000 A1    Aug. 11, 2011

(30) Foreign Application Priority Data

Feb. 10, 2010 (JP) ................................. 2010-027943

(51) Int. Cl.
*F15B 13/04* (2006.01)
(52) U.S. Cl.
USPC ................................. 137/596.14; 137/596.18
(58) Field of Classification Search
USPC ................................. 137/596, 596.14, 596.18
See application file for complete search history.

(56) References Cited

U.S. PATENT DOCUMENTS

| | | | | |
|---|---|---|---|---|
| 4,616,674 A | * | 10/1986 | Bardoll | 137/596.18 |
| 4,729,408 A | * | 3/1988 | Coutant | 137/637.1 |
| 4,763,691 A | * | 8/1988 | Hahmann | 137/596.14 |
| 2001/0022196 A1 | * | 9/2001 | Fagerstrom | 137/596.18 |

FOREIGN PATENT DOCUMENTS

| | | |
|---|---|---|
| JP | 62-184281 | 8/1987 |
| JP | 2002-13504 | 1/2002 |
| JP | 2003-120834 | 4/2003 |

OTHER PUBLICATIONS

Office Action issued Dec. 6, 2011, in Japanese Patent Application No. 2010-027943 (with English-language translation).

* cited by examiner

*Primary Examiner* — Craig Schneider
(74) *Attorney, Agent, or Firm* — Oblon, Spivak, McClelland, Maier & Neustadt, L.L.P.

(57) ABSTRACT

To provide a decompression switching valve that enables reduction in the running cost and initial cost, by saving of air consumption and simplifying and downsizing of equipment. A decompression switching valve includes one valve hole, a main valve body having air supply ports, a first output port, a second output port, and an air exhaust port which are communicated with the valve hole, and a first spool and a second spool which are slidably provided in the valve hole, adjacent to each other, wherein the first spool forms a switching valve section that selectively connects the first output port to an air supply port or the air exhaust port, and wherein the second spool forms a decompression valve section that reduces the pressure of compressed air having been input from the air supply port and outputs the pressure from the second output port.

9 Claims, 5 Drawing Sheets

DECOMPRESSION SWITCHING VALVE

TECHNICAL FIELD

The present invention relates to a switching valve having a decompression function, and, in particular, relates to a decompression switching valve integrally provided with a switching valve section and a decompression valve section that decompresses a supplied compressed air and outputs the decompressed air.

BACKGROUND ART

Hitherto, for example, air cylinders as an air pressure actuator have been widely used for a variety of automatic machines and have a structure where a piston with a fixed rod is reciprocally moved in a pressure chamber by supplying and exhausting compressed air. In general, compressed air is supplied and exhausted to/from such an air cylinder through a switching valve.

In such an air cylinder, for a work stroke, a pressing stroke which is one of the two strokes of the piston moving reciprocally, a large driving force is necessary because an external load is applied to the rod. On the other hand, for a return stroke, by which the piston returns to the initial position, a driving force is smaller than that for the work stroke because the external load is not applied to the rod. The driving force depends on the pressure of the compressed air supplied to the pressure chamber. Therefore, in consideration of energy conservation and reduction in the running cost by saving air consumption, the pressure of compressed air for the return stroke is desirably set lower than that for work stroke.

To solve such a problem, arrangement of decompression valves 6, 125 on a main flow path connected with the pressure acting chambers of a cylinder tube is offered in PTL 1. However, it is necessary to provide the decompression valves 6, 125 in addition to switching valves for switching supply and exhaust air to/from the respective pressure acting chambers of the cylinder tube, causing problems of complication and a large size of equipment and a high initial cost.

CITATION LIST

Patent Literature
[PTL 1] Japanese Unexamined Patent Application Publication No. 2002-13504

SUMMARY OF INVENTION

Technical Problem

Accordingly, an object of the invention is to provide a decompression switching valve capable of reducing in the running cost and the initial cost, by saving air consumption and simplifying and downsizing of equipment.

Solution to Problem

For the above-described object, a decompression switching valve, according to the present invention, having one valve hole that penetrates in a direction of an axis, air supply ports, a first output port, a second output port, and an air exhaust port, the ports communicating with the valve hole, includes: a main valve body having a first end and a second end with respect to the direction of the axis; a first spool slidably provided on a side of the first end in the valve hole in the direction of the axis; a second spool slidably provided on a side of the second end adjacent to the first spool side in the valve hole in the direction of the axis; and a spool driving section that presses the first spool to slide toward the second end, and thereby switches location of the first spool from a first switching position on the side of the first end to a second switching position on the side of the second end, wherein the first spool and the spool driving section form a switching valve section that connects the first output port to the air exhaust port when the first spool is located at the first switching position, and connects the first output port to the air supply port when the first spool has been driven by the spool driving section and is thereby located at the second switching position, and wherein the second spool forms a decompression valve section that connects the second output port to the air supply port when the first spool is located at the first switching position, to decompress compressed air having been supplied to the air supply port and output the decompressed air from the second output port, and connects the second output port to the air exhaust port when the first spool is located at the second switching position.

Specifically, when the spool driving section is driven, the second spool is pressed by the first spool to slide toward the second end and the second output port is connected to the air exhaust port.

Further, the decompression valve section includes an elastic member that applies an elastic applying force to the second spool toward the first end, and a pressure receiving surface that makes a pressure of the second output port act on the second spool in a direction opposite to the applying force, wherein the second spool is reciprocally moved in the direction of the axis on the basis of the applying force of the elastic member and a force caused by the pressure acting on the pressure-receiving surface and a cross-sectional area of a flow path that communicates from the air supply port to the second output port changes, and thereby the compressed air supplied to the air supply port is decompressed to a predetermined pressure based on the applying force to be output from the second output port.

More specifically, the decompression valve section includes a pressure-adjusting piston that is joined with the second end side of the second spool and reciprocally slides in the direction of the axis in a cylinder hole, wherein the pressure-adjusting piston is provided with the pressure-receiving surface and is coupled with the elastic member.

Further, a pressure-adjusting flow path, through which an air pressure in the second output port is transferred to the pressure-receiving surface, is formed inside the second spool in the direction of the axis from an opening of an annular flow path formed on an outer circumference of the second spool, and connected to a cylinder chamber that is divided by the pressure receiving surface, wherein the second output port and the cylinder chamber are typically communicated with each other by the pressure-adjusting flow path.

Herein, it is preferable that the applying force of the elastic member in the decompression valve section is variable. In this situation, the decompression valve section may include an adjusting mechanism for adjusting a compressive amount of the elastic member to allow changing of the applying force; or, the decompression valve section may be arranged to allow replacing the elastic member with an elastic member having a different elastic modulus to change the applying force. The elastic member is preferably a coil spring.

Further, the spool driving section may include a driving piston, which is joined with the first end side of the first spool and reciprocally moves in the direction of the axis, and an electromagnetic valve for driving the driving piston and the first spool is pressed by driving of the driving piston to slide toward the second end.

Advantageous Effects of Invention

For a decompression switching valve according to the present invention, a first spool and a second spool are slidably provided in one valve hole that penetrates through a main valve body, and a switching valve section having the first spool and a decompression valve section having the second spool are formed integrally with the main valve body. Thus, energy conservation by saving the air consumption, and simplifying and downsizing of equipment, can be simultaneously realized, which enables reduction in the running cost and the initial cost of equipment.

DESCRIPTION OF EMBODIMENTS

Figure 1:
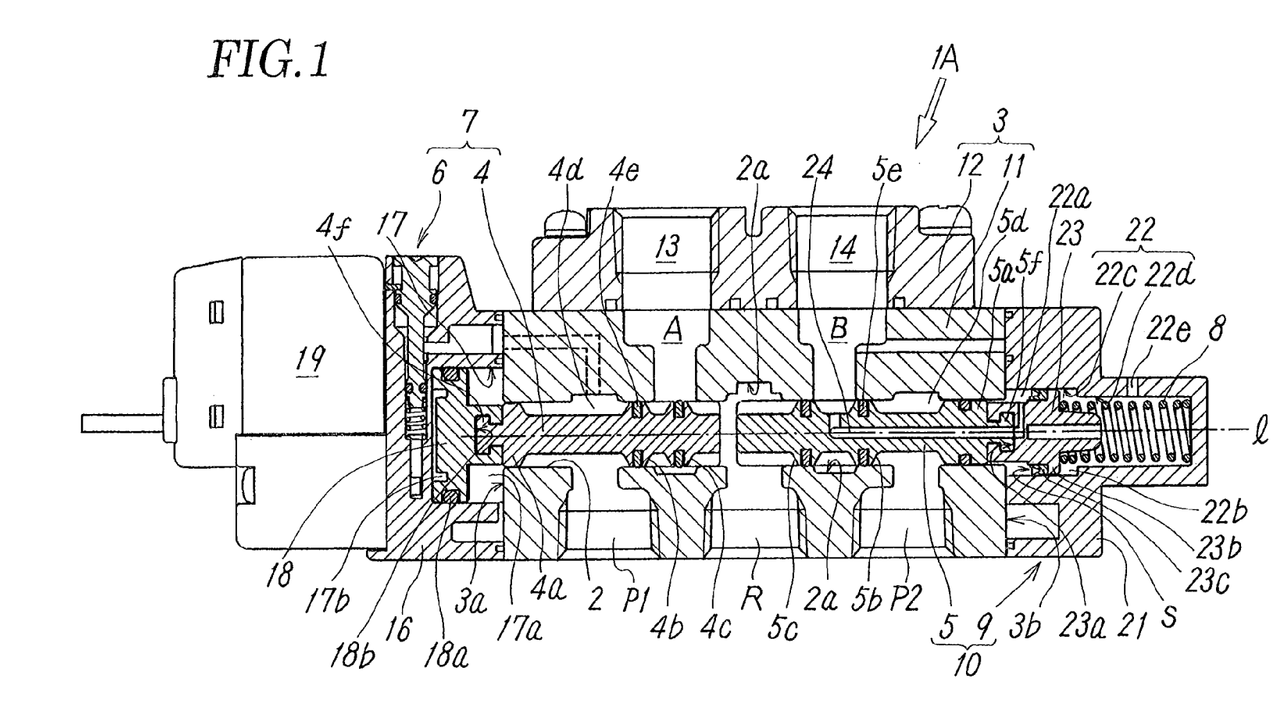
FIG. 1 is a cross-sectional view of a decompression switching valve in a first embodiment according to the invention.

As shown in FIG. 1, a decompression switching valve 1A in a first embodiment according to the invention includes a main valve body 3 having one valve hole 2 that penetrates along the axis l, a first air supply port P1, a second air supply port P2, a first output port A, a second output port B, and an air exhaust port R which are communicated with the valve hole 2, wherein the main valve body 3 has a first end 3a and a second end 3b which face opposite directions at the respective ends thereof with respect to the direction of the axis l. In the valve hole 2, a first spool 4 is slidably provided on the first end 3a side in the valve hole 2, and a second spool 5 is provided slidably along the axis l on the second end 3b side with respect to the first spool 4, adjacent to the first spool 4, and attachably and detachably with/from the first spool 4.

Herein, the first output port A is arranged to connect with the first air supply port P1 or the air exhaust port R, depending on the sliding position of the first spool 4, while the second output port B is arranged to connect with the second air supply port P2 or the air exhaust port R, depending on the sliding position of the second spool 5.

At the first end 3a of the main valve body 3, a spool driving section 6 is provided that presses the first spool 4 toward the second end 3b along the axis l so that the first spool 4 slides from the first switching position (refer to FIGS. 2 to 4) on the first end 3a side to the second switching position (refer to FIG. 5) on the second end 3b side, and thus the position of the first spool 4 is switched.

Herein, when the first spool 4 is located at the first switching position, the first output port A is connected with the air exhaust port L and when the first spool 4 is located at the second switching position, the first output port A is connected with the first air supply port P1. In such a manner, the first spool 4 and the spool driving section 6 form a switching valve section 7.

On the other hand, on the second end 3b side of the main valve body 3, a pressure adjusting section 9 is provided that includes an elastic member 8 which applies an elastic applying force to the second spool 5 toward the first end 3a along the axis l, and a pressure receiving surface S that makes the pressure of the second output port B act on the second spool 5 in the direction opposite to the above-described applying force along the axis l.

Herein, when the first spool 4 is located at the first switching position, the second output port B is connected with the second air supply port P2 so that the second spool 5 reciprocally slides in the direction of the axis l on the basis of the applying force of the elastic member 8 and the pressure acting on the pressure-receiving surface S, both forces are acting in the adjusting section 9, and thereby the cross-sectional area of a flow path communicating from the air supply port P2 to the second output port B changes. As a result, the compressed air supplied from the second air supply port P2 is decompressed to a predetermined pressure defined by the applying force of the elastic member 8 to be output from the second output port B (refer to FIGS. 2 to 4). On the other hand, when the first spool 4 is located at the second switching position, the second spool 5 is pressed and slid by the first spool 4 toward the second end 3b, accompanying driving of the spool driving section 6, and as a result, the second output port B is connected with the air exhaust port R (refer to FIG. 5). In such a manner, the second spool 5 and the pressure adjusting section 9 form the decompression valve section 10.

Specifically, the main valve body 3 of a decompression switching valve 1A in the present embodiment includes a valve casing 11 having the penetrating valve hole 2 and a port connection block 12. The valve casing 11 has the first end 3a and the second end 3b at the respective ends with respect to the direction of the axis l. On one surface along the axis l of the valve casing 11, the first air supply port P1, the air exhaust port L and the second air supply port P2 are openly formed sequentially from the first end 3a side to the second end 3b side, wherein air pipes can be directly connected to these ports P1, L and P2. On the other surface on the side opposite to the one surface, the first output port A and the second output port B are openly formed, sequentially from the first end 3a side to the second end 3b side. Herein, the first output port A is arranged at an intermediate position between the first air supply port P1 and the air exhaust port L and the second output port B is arranged at an intermediate position between the air exhaust port L and the second air supply port P2. Further, inner circumferential recessions 2a are annularly formed at positions communicating the respective ports P1, R, P2, A, and B.

On the other hand, a first port connection hole 13 and a second port connection hole 14 are formed penetrating through the port connection block 12 to connect the air pipes. The port connecting block 12 makes the first port connection hole 13 and the second hole connection hole 14 communicate respectively with the first output port A and the second output port B, and is fixed on the other surface of the valve casing 11 with fixing members such as bolts to be air-sealed. That is, the air pipes for output can be connected to the first output port A and the second output port B respectively through the first port connection hole 13 and the second port connection hole 14 of the port connecting block 12.

The first spool 4 is formed to be longer than the distance along the axis 1 from the first end 3a to the first output port A in the valve hole 2 of the valve casing 11, and shorter than the distance along the axis 1 from the first end 3a to the second output port B. The outer circumference of the first spool 4 is annularly provided with a first land section 4a, a second land section 4b, and a third land section 4c, sequentially from the first end 3a side. Further, three annular flow paths 4d are formed adjacent to these land sections 4a to 4c. Still further, annular sealing members 4e of an elastic material are fixed on the outer circumferences of the second land section 4b and the third land section 4c, and the land sections 4b and 4c are slid with airtightness in the valve hole 2. Thus, the first output port A can be selectively connected with the first air supply port P1 or the air exhaust port R through an annular flow path 4d.

Incidentally, although, in the present embodiment, a sealing member is not particularly provided on the first land section 4a typically located between the first air supply port P1 and the first end 3a in the valve hole 2, it is of course possible to provide a sealing member.

On the other hand, the second spool 5 is formed to be longer than the distance along the axis 1 from the second end 3b to the second output port B in the valve hole 2 of the valve casing 11, and shorter than the distance along the axis 1 from the second end 3b to the first output port A. The outer circumference of the second spool 5 is annularly provided with a first land section 5a, a second land section 5b, and a third ran section 5c, sequentially from the second end 3b side. Further, three annular flow paths 5d are formed adjacent to these land sections 5a to 5c. Still further, annular sealing members 5e of an elastic material are fixed on the outer circumferences of the respective land sections 5b to 5c, and the land sections 5a to 5c slide with airtightness in the valve hole 2. Herein, depending on the sliding position of the second land section 5b and the third land section 5c, the second output port B can be made communicate selectively with the second air supply port P2 or the air exhaust port R through an annular flow path 5d, and the second output port B can be disconnected from the second air supply port P2 and the air exhaust port R.

The first land section 5a is typically located between the second air supply port P2 and the second end 3b in the valve hole 2 to ensure the airtightness between the respective annular flow paths 5d and a second cylinder hole 22, later-described, of the pressure adjusting section 9.

The spool driving section 6 is slidably provided in a first cylinder body 16 having a first cylinder hole 17, which is open on the valve hole 2 side and has a bottom, and in the first cylinder 17. The spool driving section 6 includes a driving piston 18, which sections the first cylinder hole 17 into a first cylinder chamber 17a on the valve hole 2 side and a second cylinder chamber 17b on the opposite side, and an electromagnetic valve 19, which supplies pilot air to the second cylinder chamber 17b to drive the driving piston 18 toward the valve hole 2. Herein, an annular sealing member 18a of an elastic material is provided on the outer circumference of the driving piston 18 to ensure the airtightness between the first cylinder chamber 17a and the second cylinder chamber 17b. The first cylinder hole 17 has a diameter larger than that of the valve hole 2, and the first cylinder body 16 is fixed with airtightness on the end face of the first end 3a of the valve casing 11 such that the first cylinder hole 17 and the valve hole 2 are coaxial with each other.

Further, the driving piston 18 has a first engagement recessed section 18b on the first cylinder chamber 17a side on the axis 1, the engagement recessed section 18b having a cross-section substantially in a T-shape that is open on the valve hole 2 side and enlarged at a deep portion, while the first spool 4 has an engagement protruding section 4f on the axis 1 at the end face arranged on the first end 3a side, the engagement protruding section 4f being formed with a cross-section substantially in a T-shape and enlarged at the tip end portion. The first engagement recessed section 18b and the first engagement protruding section 4f are engaged with each other by recession and protrusion. That is, the driving piston 18 and the first spool 4 are coupled with each other along the axis 1, and reciprocally move together in the direction of the axis 1.

The pressure adjusting section 9 has a second cylinder body 21 having the second cylinder hole 22 that is open on the valve hole 2 side and has a bottom, and a pressure-adjusting piston 23 that is slidably provided in the second cylinder hole 22 and sections the second cylinder hole 22 with airtightness into a first cylinder chamber 22a on the valve hole 2 side and a second cylinder chamber 22b on the opposite side. The second cylinder body 21 is fixed with airtightness on the end face of the second end 3b of the valve casing 11 such that the second cylinder body 22 and the valve hole 2 are coaxial with each other.

Herein, the second cylinder hole 22 has a large diameter section 22c on the valve hole 2 side and a small diameter section 22d on the deep side, the two sections being adjacent to each other in the direction of the axis 1. The large diameter section 22c has a diameter larger than that of the valve hole 2, wherein the pressure-adjusting piston 23 is located at the large diameter section 22c, and a breathing hole 22e is provided for the small diameter section 22d.

The second output port B and the first cylinder chamber 22a are typically communicated with each other through the pressure-adjusting flow path 24, which introduces the air pressure of the second output port B to the above-described pressure-receiving surface. The pressure-receiving surface S is provided on the first cylinder chamber 22a side of the pressure-adjusting piston 23, and the elastic member 8 is provided on the second cylinder chamber 22b side of the pressure-adjusting piston 23 in a compressed state and coaxially with the pressure-adjusting piston 23.

Further, the pressure-adjusting piston 23 has a second engagement recessed section 23a, on the first cylinder chamber 22a side on the axis 1, with a cross-section substantially in a T-shape that is open on the valve hole 2 side and enlarged at a deep portion, while the second spool 5 has a second engagement protruding section 5f at the end face arranged on the second end 3b side on the axis 1, the engagement protruding section 5f being formed with a cross-section substantially in a T-shape and enlarged at the tip end portion. The second engagement recessed section 23a and the second engagement protruding section 5f are engaged with each other by recession and protrusion. That is, the pressure-adjusting piston 23 and the second spool 5 are coupled with each other along the axis 1, and reciprocally move in the direction of the axis 1 being coupled with each other.

More specifically, the outer circumference of the pressure-adjusting piston 23 is integrally provided with an annular protruding section 23b formed with a diameter slightly smaller than that of the large diameter section 22c and larger than that of the small diameter section 22d. Further, a sealing member 23c, which is in a lip shape and open on the first cylinder chamber 22a side, is fitted to the outer circumference of the pressure-adjusting piston 23, wherein the back surface of the sealing member 23c is in contact with the end surface, on the first cylinder chamber 22a side, of the annular protruding section 23b. That is, the sealing member 23c ensures the airtightness between the first cylinder chamber 22a and the second cylinder chamber 22b, and forms the pressure-receiving surface S in an annular shape.

Further, the pressure-adjusting flow path 24 is open to the annular flow path 5d formed between the second land section 5b and the third land section 5c of the second spool 5, extends in the second spool 5 along the axis l toward the second end 3b, goes sequentially through the engagement section between the second engagement protruding section 5f and the second engagement recessed section 23a, and the inside of the pressure-adjusting piston 23, and is open at the outer circumferential surface that faces the first cylinder chamber 22a.

Still further, the elastic member 8 is a pressure-adjusting spring (a coil spring) and is compressed between the end surface of the pressure-adjusting piston 23, the end surface facing the second cylinder chamber 22b, and the bottom surface of the second cylinder hole 22, the bottom surface likewise facing the second cylinder chamber 22b. Herein, the elastic modulus and the compressive amount of the elastic member 8, the elastic modulus and the compressive amount defining the applying force (elastic resistant force) of the elastic member 8, are set such that, when the air pressure of the second output port B has been adjusted to a pressure lower than the air pressure supplied to the second air supply port P2, the second land section 5b and the third land section 5c of the second spool 5 are located at positions where the second land section 5b and the third land section 5c disconnect the second output port B from the second air supply port P2 and the air exhaust port R (refer to FIG. 4).

Next, the operation of the decompression switching valve 1A will be specifically described, referring to FIGS. 2 to 5. Herein, the description will be made, taking an example where the first output port A and the second output port B are connected respectively with the head-side pressure chamber 26 and the rod-side pressure chamber 27 of an air cylinder 25, while the first air supply port P1 and the second air supply port P2 are connected with a common air supply source 30.

Figure 2:
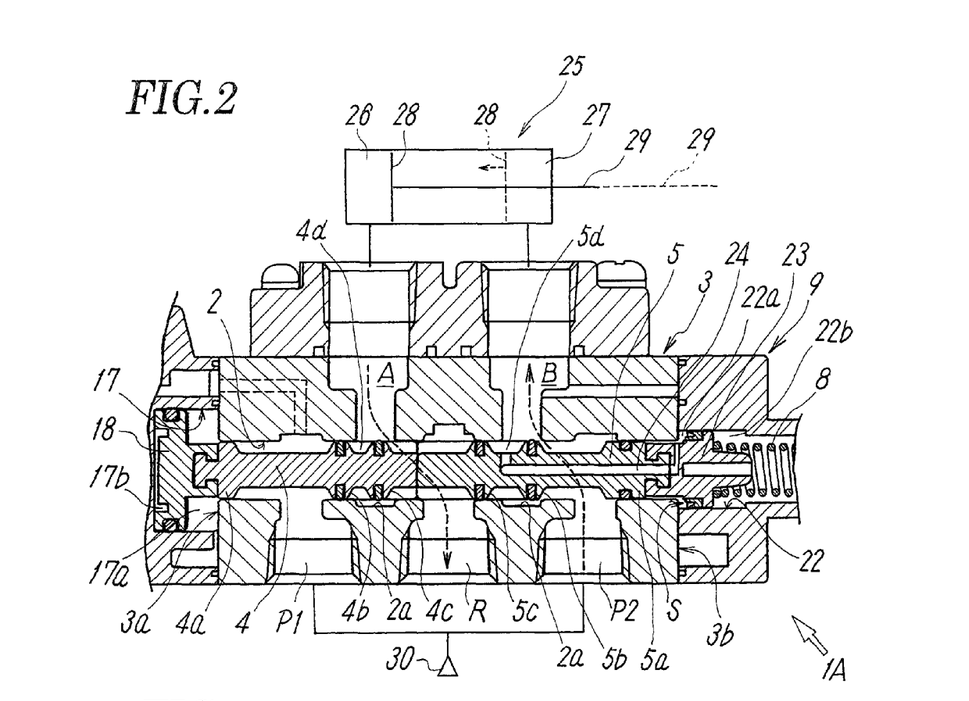
FIG. 2 is a cross-sectional view of a main part showing an operational state of the decompression switching valve according to the invention.

First, in the initial state that the electromagnetic valve is off and compressed air is not supplied to the first air supply port P1 nor the second air supply port P2, the pressure of compressed air is not acting on the pressure-receiving surface S of the pressure-adjusting piston 23, as shown in FIG. 2, the second spool 5 is pressed by the applying force of the compressed elastic member 8 in the valve hole 2 toward the first end 3a of the main valve body 3, and first spool 4 is simultaneously pressed by the second spool 5 toward the first end 3a to be located at the first switching position.

At this moment, the first output port A and the first air supply port P1 are disconnected from each other with sealing by the second land section 4b of the first spool 4, while the sealing, by the third land section 4c of the first spool 4, between the first output port A and the air exhaust port R being open to the atmosphere is released so that the first output port A and the air exhaust port R are connected with each other through the annular flow path 4d, which is adjacent to the third land section 4c.

On the other hand, the second output port B and the air exhaust port R are disconnected from each other with sealing by the third land section 5c of the second spool 5, while the sealing by the second land section a of the second spool 5 is released so that the second output port B and the second air supply port P2 are connected with each other through the annular flow path 5d, which is adjacent to the second land section 5b.

Further, as shown by the solid line in FIG. 2, it is assumed that, in the initial state, the piston 28 of the air cylinder 25 is located at the head-side end portion, and the rod 29 fixed to the piston 28 is back at the initial position.

In this situation, when compressed air with a pressure of p is supplied from the air supply source 30, the compressed air is supplied from the second air supply port P2 through the annular flow path 5d to the second output port B, as shown by the arrow, then the pressure of the second output port B begins to rise, and the pressure inside the first cylinder chamber 22a of the second cylinder hole 22 also simultaneously begins to rise through the pressure-adjusting flow path 24.

Figure 3:
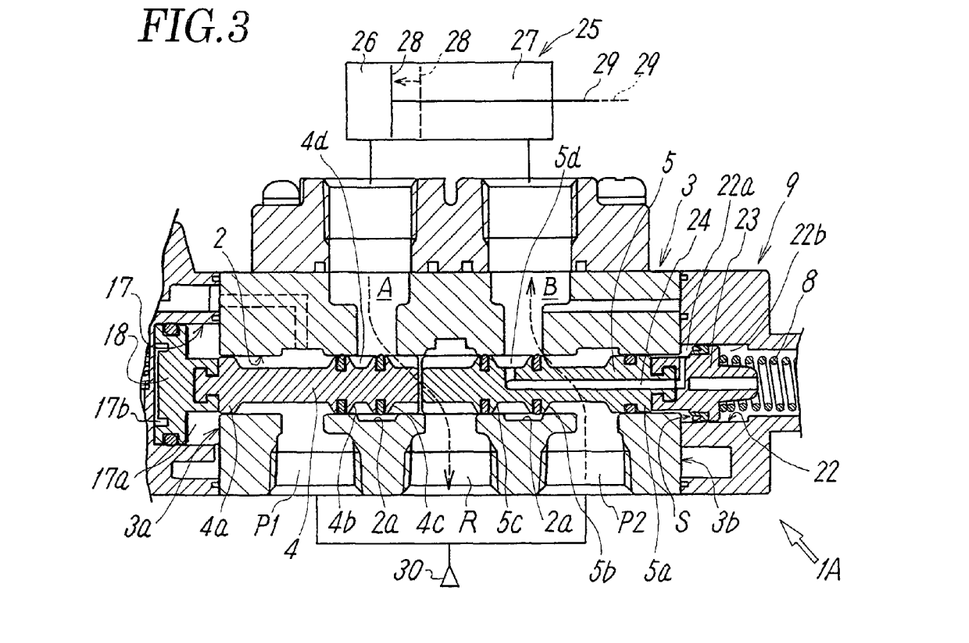
FIG. 3 is a cross-sectional view of the main part showing an operational state of the decompression switching valve according to the invention.

Then, as the pressure acts on the pressure receiving surface S of the pressure-adjusting piston 23, the pressure-adjusting piston 23 is pushed back toward the second cylinder chamber 22b of the second cylinder hole 22, as shown in FIG. 3, against the applying force of the elastic member 8. As a result, the second spool 5 separates from the first spool 4 located at the first switching position and slides toward the second end 3b, and the second land section 5b of the second spool 5 narrows the cross-sectional area of the flow path that extends from the second air supply port P2 to the second output port B. Thereafter, depending on the change in the pressure of the second output port B, the second spool 5 reciprocally moves in the direction of the axis 1 and thus changes the cross-sectional area of the flow path, while thereby supplying compressed air through the second output port B to the rod-side pressure chamber 27 of the air cylinder 25.

Figure 4:
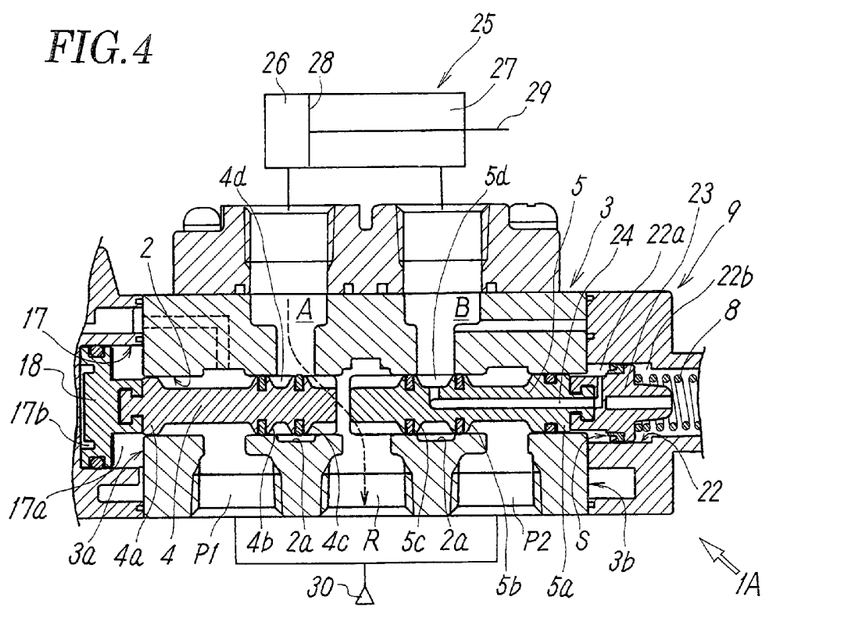
FIG. 4 is a cross-sectional view of the main part showing an operational state of the decompression switching valve according to the invention.

Then, when the pressure of the second output port B (namely the pressure of the rod-side pressure chamber 27 of the air cylinder 25) is lower than the above-described supplied pressure p to become a predetermined pressure p' defined by the applying force of the elastic member 8, the second land section 5b and the third land section 5c of the second spool 5, as shown in FIG. 4, disconnects the second output port B from the second air supply port P2 and the air exhaust port R.

Figure 5:
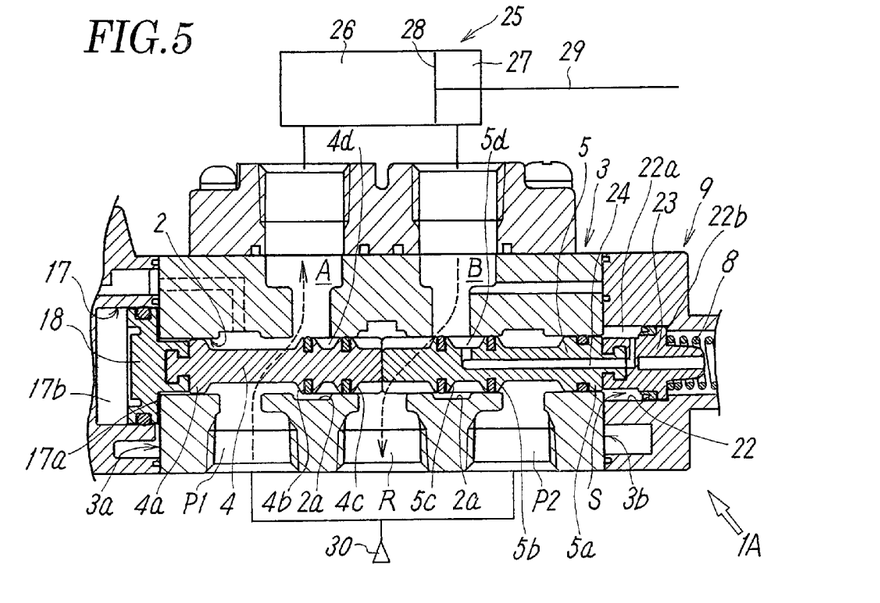
FIG. 5 is a cross-sectional view of the main part showing an operational state of the decompression switching valve according to the invention.

Next, in order to switch to a work stroke that makes the rod 29 to perform work by forwarding the rod 29 of the air cylinder 25, the electromagnetic valve 19 is turned on to supply pilot air to the second cylinder chamber 17b of the first cylinder hole 17. Then, as shown in FIG. 5, the driving piston 18 is driven toward the first cylinder chamber 17a to slide the first spool 4 to the second switching position in the direction of the second end 3b, and the second spool 5 is pressed by the first spool 4 to simultaneously slide toward the second end 3b. Herein, the driving force of the driving piston 18 by the pilot air is assumed to be sufficiently larger than the applying force of the elastic member 8.

Herein, sealing between the first output port A and the first air supply port P1 by the second land section 4b of the first spool 4 is released, and the first output port A and the first air supply port P1 are connected with each other through the annular flow path 4d adjacent to the second land section 4b, while the first output port A and the air exhaust port R are disconnected from each other with sealing by the third land section 4c of the first spool 4.

On the other hand, sealing between the second output port B and the air exhaust port R by the third land section 5c of the second spool is released, and the second output port B and the air exhaust port R are connected with each other through the annular flow path 5d adjacent to the third land section 5c, while the second output port B and the second air supply port P2 are disconnected from each other with sealing by the third land section 5c of second spool 5.

Then, compressed air with the pressure p from the air supply source 30 is quickly supplied through the first air supply port P1 to the head-side pressure chamber 26 of the air cylinder 25, and the compressed air of the rod-side pressure chamber 27 is discharged to the atmosphere through the air exhaust port R. As a result, the piston 28 of the air cylinder 25 is driven toward the rod-side pressure chamber 27 while the rod 29 simultaneously performs work.

During the work stroke, an external load acts on the rod 29. However, because the compressed air with the pressure p sufficiently high can be supplied to the head-side pressure chamber 26, a sufficient driving force corresponding to the external load can be applied to the piston 28, and the response of the work stroke can be simultaneously ensured.

Subsequently, following the work stroke, in order to switch to a return stroke that moves the rod 29 back to the initial position, the electromagnetic valve 19 is turned off and thereby the second cylinder chamber 17b of the cylinder hole 17 is released to the atmosphere.

As a result, as shown in FIG. 2 again, the applying force of the compressed elastic member 8 presses the second spool 5 to slide the second spool 5 toward the first end 3a of the main valve body 3, and the second spool 5 simultaneously presses the first spool 4 toward the first end 3a to switch the position of the first spool 4 to the first switching position. At this moment, because, as shown by the dashed line in FIG. 2, supply of compressed air from the air supply source 30 to the rod-side pressure chamber 27 of the air cylinder 25 starts and the head-side pressure chamber 26 is released to the atmosphere, driving of the piston 28 toward the rod-side pressure chamber 27 starts, as shown by the dashed line in FIG. 2, and the rod 29 simultaneously starts moving back toward the initial position. Herein, if arrangement is made such that a part of the exhaustion air from the head-side pressure camber 26 is introduced for a moment to the rod-side pressure chamber 27 through the second output port B when the state in FIG. 5 is switched to the state in FIG. 2, the response of the return stroke can be improved by the action of the exhaustion pressure.

Then, the air pressure of the second output port B (namely, the air pressure of the rod-side pressure chamber 27) is supplied to the first cylinder chamber 22a of the second cylinder hole 22 of the pressure adjusting section 9 to act on the pressure receiving surface S of the pressure-adjusting piston 23. Consequently, as shown in FIG. 3 again, the second land section 5b of the second spool 5 narrows the cross-sectional area of the fluid path extending from the second air supply port P2 to the second output port B. Herein, if a throttle section, for example, is provided at the opening portion of the pressure-adjusting flow path 24 to the annular flow path 5d, the timing of the action by the air pressure of the second output port B on the pressure receiving surface S can be delayed, and as a result, the timing of narrowing the cross-sectional area of the flow path extending from the second air supply port P2 to the second output port B (namely, the timing of the change in the position of the second spool 5 from the state in FIG. 2 to the state in FIG. 3) can be delayed, which improves the response of the return stroke.

Corresponding to a change in the pressure of the second output port B accompanying driving of the piston 28, the second spool 5 reciprocally moves in the direction of the axis l while changing the cross-sectional area of the flow path so that compressed air is gradually supplied to the second output port B.

Further, as shown in FIG. 4 again, when the piston 28 reaches the head-side end portion and the rod 29 simultaneously moves back to the initial position so that the pressure of the rod-side pressure chamber 27 (namely, the pressure of the second output port B) becomes the predetermined pressure p' being lower than the pressure p of compressed air supplied from the air supply source 30 to the second air supply port P2, the second spool 5 disconnects the second output port B from the second air supply port P2 and the air exhaust port R.

That is, the spool driving section 6 and the first spool 4 function as a switching valve that directly outputs the supply pressure p from the first output port A, while the pressure adjusting section 9 and the second spool 5 function as a decompression valve that reduces the supply pressure p to output the pressure from the second output port B.

In such a manner, in the decompression switching valve 1A, not only saving of air consumption can be attained by the decompression valve section 10 during a return stroke where a large load is not applied, for example, to an actuator, but also, because the main valve body 3 is integrally provided with the decompression valve section 10 and the switching valve section 7, energy conservation, and simplifying and downsizing of equipment, can be simultaneously realized, which enables reduction in the running cost and the initial cost of equipment.

Figure 6:
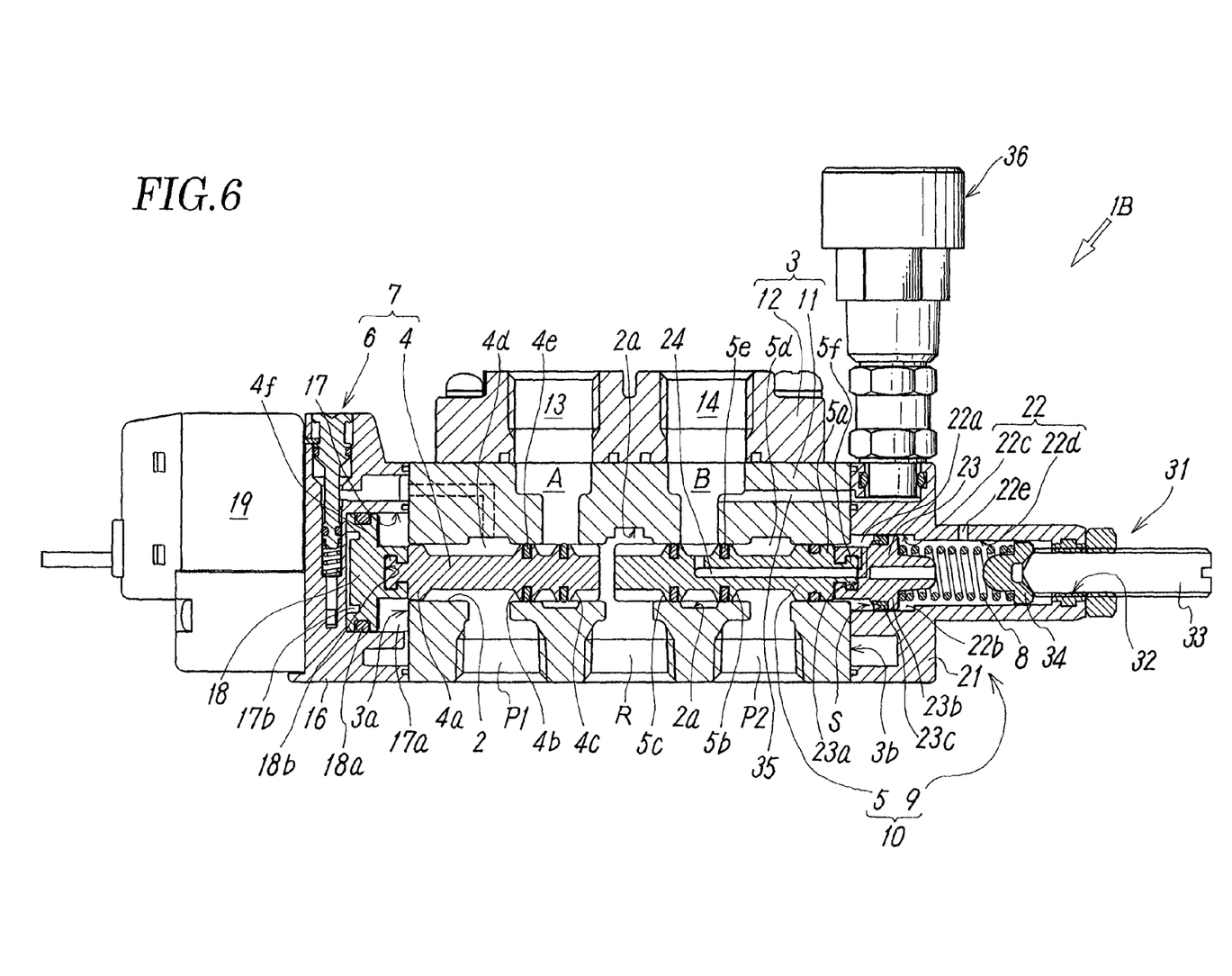
FIG. 6 is a cross-sectional view of a decompression switching valve in a second embodiment according to the invention.

Next, referring to FIG. 6, a second embodiment according to the invention will be described. To avoid redundant description, structures which are different from those in the first embodiment will be mainly described below, the same symbols will be assigned to other common elements in the figure, and description of these common elements will be omitted.

The primary difference of a decompression switching valve 1B in the second embodiment from the decompression switching valve 1A in the first embodiment is that, for the decompression valve section 10, the decompression amount by the decompression valve section 10 is made variable by making the applying force of the elastic member 8 adjustable.

Specifically, the pressure adjusting section 9 of the decompression valve section 10 is provided with an adjusting mechanism 31 for adjusting the compressive amount of the elastic member 8. The adjusting mechanism 31 is arranged at the bottom wall of a second cylinder hole 22 of a second cylinder body 21, penetrating to outside in the direction of the axis l. The adjusting mechanism 31 includes a thread hole 32, which is provided with a female thread on the inner circumference, an adjusting screw 33, which is provided with a male thread on the outer circumference and is inserted from outside into the second cylinder hole 22 to be thread-engaged with the inside of the thread hole 32, and a spring-receiving member 34, which is slidable in the direction of the axis l at the small diameter section 22d of the second cylinder hole 22 to receive one end of the elastic member 8 and to be in contact with the tip end portion of the adjusting-screw 33. Further, a pressure-measuring flow path 35 is branched from the second output port B and connected to a pressure gauge 36 fitted on the second cylinder body 21.

The adjusting screw 33 is moved forward or backward inside the second cylinder hole 22 by rotational operation from outside to adjust the compressive amount of the elastic member 8, which is arranged with compression between the pressure-adjusting piston 23 and the spring-receiving member 34, and thus the decompression amount by the decompression valve section 10 can be adjusted.

That is, when the compressive amount of the elastic member 8 is increased by moving the adjusting screw 33 forward, the applying force applied by the elastic member 8 to the second spool 5 increases, which enables a decrease in the decompression amount by the decompression valve section 10. In reverse, by moving the adjusting screw 33 backward, the decompression amount by the decompression valve section 10 can be increased.

In this situation, as it is possible to adjust the compressive amount of the elastic member 8 while confirming the pressure of the second output port B with the pressure gauge 36, the pressure of the second output port B can be easily set to a desired predetermined pressure p'.

Figure 7:
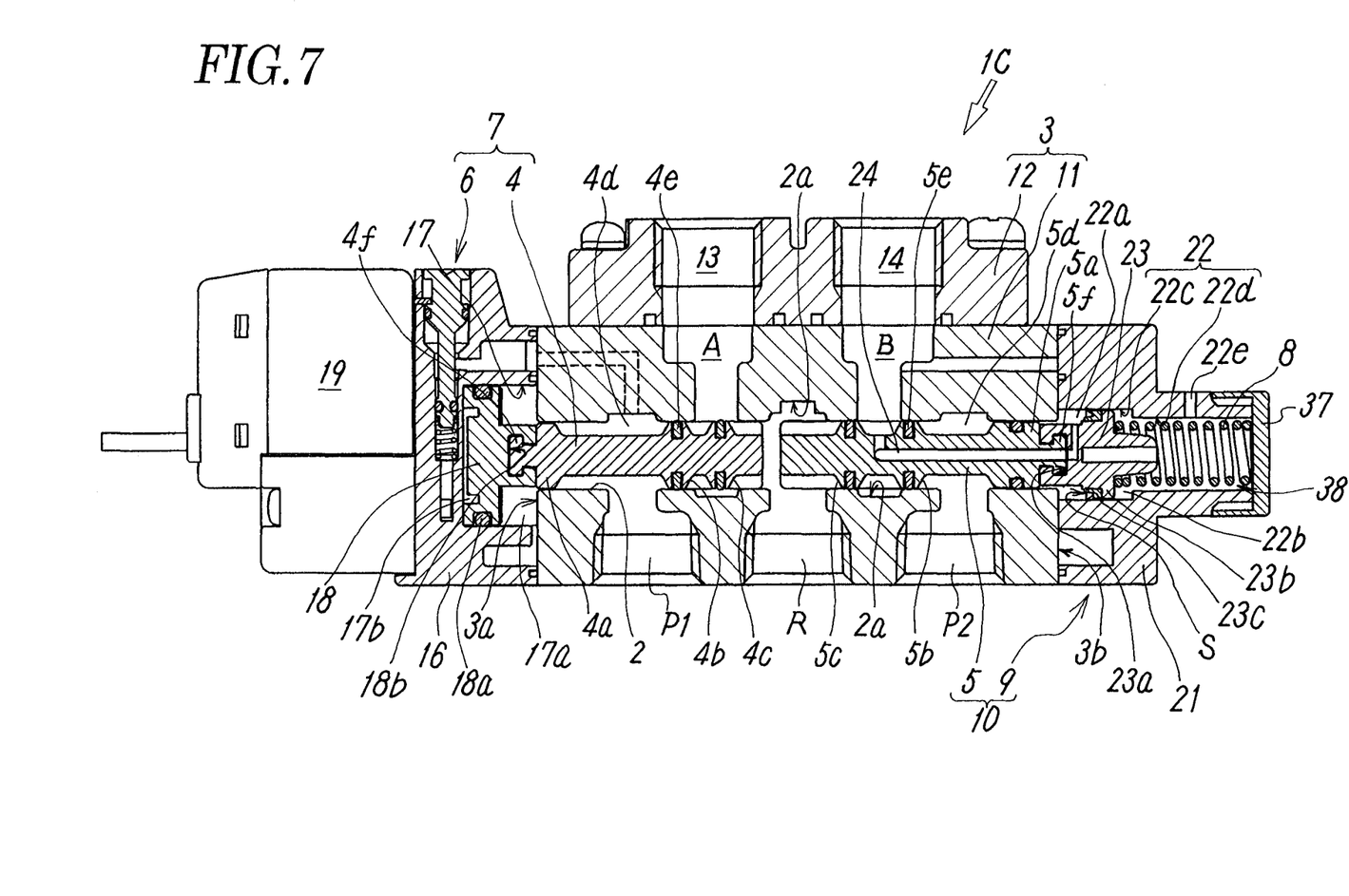
FIG. 7 is a cross-sectional view of a decompression switching valve in a third embodiment according to the invention.

Next, referring to FIG. 7, a third embodiment of a decompression switching valve according to the invention will b described. To avoid redundant description, structures which are different from those in the first embodiment will be mainly described below, the same symbols will be assigned to other common elements in the figure, and description of these common elements will be omitted.

The primary difference of a decompression switching valve 1C in the third embodiment from the decompression switching valve 1A in the first embodiment is that, for the decompression valve section 10, the decompression amount by the decompression valve section 10 is made variable by making the elastic member 8 replaceable.

For a pressure adjusting section 9 of the decompression valve section 10, the bottom wall of the second cylinder hole 22 of a second cylinder body 21 is formed by a lid member 37 that is attachable and detachable.

Specifically, the outer circumferential surface of the bottom opening 38 of the second cylinder hole 22 of the second cylinder body 21 is provided with a male thread, while the inner circumferential surface of the lid member 37 with a cross-section substantially in a U-shape is provided with a female thread. The lid member 37 is fitted on the second cylinder body 21 attachably and detachably by thread-engagement. The elastic member 8 is compressed between the pressure-adjusting piston 23 and the lid member 37.

Accordingly, the decompression amount by the decompression valve section 10 can be changed by removing the lid member 37 from the second cylinder body 21 and replacing the elastic member 8 with another elastic member with a different elastic modulus through the bottom opening 38.

That is, if the elastic member 8 is replaced with another elastic member 8 with a larger elastic modulus, the applying force applied by the elastic member 8 to the second spool 5 becomes large, and thereby, the decompression amount by the decompression valve section 10 can be decreased. In reverse, if the elastic member 8 is replaced with another elastic member 8 with a smaller elastic modulus, the decompression amount by the decompression valve section 10 can be increased. As a result, the pressure of the second output port B can be easily set to a desired predetermined pressure p'.

Decompression switching valves in various embodiments according to the invention have been described above in detail, however, the invention is not limited to these embodiments, and it is needless to say that various design modifications and changes can be made without departing from the scope of the invention.

REFERENCE SIGNS LIST 1A, 1B, 1C: depression switching valve
2: valve hole
2a: inner circumferential recession
3: main valve body
3a: first end
3b: second end
4: first spool
5: second spool
6: spool driving section
7: switching valve section
8: elastic member (pressure-adjusting spring)
9: pressure adjusting section
10: decompression valve section
18: driving piston
19: electromagnetic valve
23: pressure-adjusting piston
24: pressure-adjusting flow path
l: axis
A: first output port
B: second output port
P1: first air supply port
P2: second air supply port
R: air exhaust port
S: pressure receiving surface

The invention claimed is:

1. A decompression switching valve having one valve hole that penetrates in a direction of an axis, air supply ports, a first output port, a second output port, and an air exhaust port, the ports communicating with the valve hole, the decompression valve comprising:

a main valve body having a first end and a second end with respect to the direction of the axis;

a first spool slidably provided on a side of the first end in the valve hole in the direction of the axis;

a second spool slidably provided on a side of the second end adjacent to the first spool in the valve hole in the direction of the axis; and a spool driving section that presses the first spool to slide toward the second end, and thereby switches location of the first spool from a first switching position on the side of the first end to a second switching position on the side of the second end, wherein a switching valve section formed by the first spool and the spool driving section connects the first output port to the air exhaust port when the first spool is located at the first switching position, and the switching valve section connects the first output port to the air supply port when the first spool is driven by the spool driving section and is thereby located at the second switching position, and wherein a decompression valve section formed by the second spool connects the second output port to the air supply port, decompresses compressed air having been supplied to the air supply port, and outputs the decompressed air from the second output port when the first spool is located at the first switching position, and the decompression valve section connects the second output port to the air exhaust port when the first spool is located at the second switching position, wherein the decompression valve section comprises an elastic member that applies an elastic applying force to the second spool toward the first end, and a pressure receiving surface that makes a pressure of the second output port act on the second spool in a direction opposite to the applying force, and wherein the second spool is reciprocally moved in the direction of the axis on the basis of a balance between the applying force of the elastic member and the pressure acting on the pressure-receiving surface, a cross-sectional area of a flow path that communicates from the air supply port to the second output port changes, and thereby the compressed air supplied to the air supply port is decompressed to a predetermined pressure based on the applying force to output from the second output port.

2. The decompression switching valve according to claim 1, wherein, when the spool driving section is driven, the second spool is pressed by the first spool to slide toward the second end and the second output port is connected to the air exhaust port.

3. The decompression switching valve according to claim 1,
wherein the decompression valve section comprises a pressure-adjusting piston that is joined with the second end side of the second spool and reciprocally slides in the direction of the axis in a cylinder hole,
and wherein the pressure-adjusting piston is provided with the pressure-receiving surface and is coupled with the elastic member.

4. The decompression switching valve according to claim 3,
wherein a pressure-adjusting flow path, through which an air pressure of the second output port is transferred to the pressure-receiving surface, is formed inside the second spool in the direction of the axis from an opening of an annular flow path formed on an outer circumference of the second spool, and connected to a cylinder chamber that is divided by the pressure receiving surface, and
wherein the second output port and the cylinder chamber are always communicated with each other by the pressure-adjusting flow path.

5. The decompression switching valve according to claim 1,
wherein the applying force of the elastic member in the decompression valve section is variable.

6. The decompression switching valve according to claim 5,
wherein the decompression valve section comprises an adjusting mechanism for adjusting a compressive amount of the elastic member, and the adjusting mechanism allows the applying force to change.

7. The decompression switching valve according to claim 5,
wherein the decompression valve section is constituted to allow replacing the elastic member with an element having a different elastic modulus from that the elastic member has, and thereby the applying force changes.

8. The decompression switching valve according to claim 1, wherein the elastic member is a coil spring.

9. The decompression switching valve according to claim 2,
wherein the spool driving section comprises a driving piston that is joined with the first end side of the first spool and reciprocally moves in the direction of the axis, and an electromagnetic valve for driving the driving piston,
and wherein the first spool is pressed to slide toward the second end by driving of the driving piston.

* * * * *